(12) United States Patent
Belmihoub-Martel et al.

(10) Patent No.: US 12,530,068 B2
(45) Date of Patent: Jan. 20, 2026

(54) POWER AWARENESS FOR ENERGY HARVESTING

(71) Applicant: Silicon Laboratories Inc., Austin, TX (US)

(72) Inventors: Yacin Belmihoub-Martel, Montréal (CA); Christian Galante, LaSalle (CA)

(73) Assignee: Silicon Laboratories Inc., Austin, TX (US)

( * ) Notice: Subject to any disclaimer, the term of this patent is extended or adjusted under 35 U.S.C. 154(b) by 67 days.

(21) Appl. No.: 18/744,613

(22) Filed: Jun. 15, 2024

(65) Prior Publication Data

US 2025/0383697 A1 Dec. 18, 2025

(51) Int. Cl.
*G06F 1/32* (2019.01)
*G01R 31/382* (2019.01)
*G06F 1/3212* (2019.01)

(52) U.S. Cl.
CPC ......... *G06F 1/3212* (2013.01); *G01R 31/382* (2019.01)

(58) Field of Classification Search
CPC .................................. G06G 1/32; G06F 9/44
See application file for complete search history.

(56) References Cited

U.S. PATENT DOCUMENTS

| | | |
|---|---|---|
| 6,327,994 B1 | 12/2001 | Labrador |
| 8,294,858 B2 | 10/2012 | Limketkai et al. |
| 8,742,623 B1 | 6/2014 | Biederman et al. |
| 9,147,295 B2 | 9/2015 | Cox |
| 9,332,134 B2 | 5/2016 | Wänstedt |
| 9,949,642 B2 | 4/2018 | Love et al. |
| 10,038,992 B1 | 7/2018 | Zalewski et al. |
| 10,213,141 B2 | 2/2019 | Cole et al. |
| 10,594,145 B1 | 3/2020 | Wang et al. |
| 10,826,335 B2 | 11/2020 | Cheatham, III et al. |
| 10,873,401 B1 | 12/2020 | Pletcher et al. |
| 11,050,462 B2 | 6/2021 | Loe |
| 11,115,123 B2 | 9/2021 | Johnson |
| 11,177,766 B2 | 11/2021 | Xue et al. |
| 11,317,802 B2 | 5/2022 | Cole et al. |

(Continued)

OTHER PUBLICATIONS

U.S. Appl. No. 19/093,534, filed Mar. 28, 2025, entitled "Secure Commissioning/Pairing Procedure for Battery-Less and Other Energy Constrained Devices," by inventors Franco Maggi et al.

(Continued)

*Primary Examiner* — Keshab R Pandey
(74) *Attorney, Agent, or Firm* — Zagorin Cave LLP

(57) ABSTRACT

A battery powered system determines available power prior to running a user application. The system uses a linear portion of a discharge curve to determine available power. If the available power is sufficient to run the user application the system runs the user application. The system stores the power needed for the user application in order to determine if the available power is sufficient. If the available power is insufficient to run the user application, the system enters a sleep state for a predetermined time period and harvests energy in the sleep state. The sleep state is repeated until there is sufficient power for the user application. The length of time in the sleep state may be based on available power and power required by the user application. The energy available to be harvested may also be used in determining the length of time in the sleep state.

20 Claims, 4 Drawing Sheets

(56) References Cited

U.S. PATENT DOCUMENTS

| | | |
|---|---|---|
| 11,604,323 B2 | 3/2023 | Alerigi |
| 11,646,754 B2 | 5/2023 | Daigle |
| 2007/0274245 A1* | 11/2007 | Balatsos .............. H04N 19/154 |
| | | 375/E7.088 |
| 2009/0253227 A1 | 10/2009 | DeFries et al. |
| 2010/0178919 A1 | 7/2010 | Deepak |
| 2011/0092726 A1 | 4/2011 | Clarke et al. |
| 2011/0225073 A1 | 9/2011 | Won |
| 2011/0279096 A1 | 11/2011 | Sonntag |
| 2012/0034954 A1 | 2/2012 | Tabe |
| 2012/0109248 A1 | 5/2012 | Danielsson et al. |
| 2012/0234922 A1 | 9/2012 | Sample et al. |
| 2012/0298499 A1 | 11/2012 | Lee |
| 2012/0319482 A1 | 12/2012 | Budampati et al. |
| 2012/0319586 A1 | 12/2012 | Riesebosch |
| 2013/0057111 A1 | 3/2013 | Mukter-Uz-Zaman et al. |
| 2013/0074913 A1 | 3/2013 | Leung et al. |
| 2013/0173443 A1 | 7/2013 | Mansfield et al. |
| 2013/0214615 A1 | 8/2013 | Taleb |
| 2014/0206927 A1 | 7/2014 | Weinberg |
| 2014/0213867 A1 | 7/2014 | Pletcher et al. |
| 2014/0283896 A1 | 9/2014 | Lunt, III et al. |
| 2014/0326295 A1 | 11/2014 | Moslehi |
| 2015/0194838 A1 | 7/2015 | Won |
| 2015/0236638 A1 | 8/2015 | Mosleih |
| 2015/0292996 A1 | 10/2015 | Hsieh |
| 2015/0377517 A1 | 12/2015 | Bushong, Jr. |
| 2015/0380973 A1 | 12/2015 | Scheb |
| 2016/0089994 A1* | 3/2016 | Keller .................... B60L 53/14 |
| | | 320/153 |
| 2016/0204294 A1 | 7/2016 | Kuznicki |
| 2017/0025857 A1 | 1/2017 | Matthews |
| 2017/0271984 A1 | 9/2017 | Kohn et al. |
| 2017/0356879 A1 | 12/2017 | Brechtel et al. |
| 2018/0108846 A1 | 4/2018 | Lunt, III et al. |
| 2019/0128191 A1 | 5/2019 | Moravek et al. |
| 2019/0187456 A1 | 6/2019 | Filo |
| 2019/0312612 A1 | 10/2019 | Stefan et al. |
| 2020/0195056 A1 | 6/2020 | Rekstad |
| 2020/0251936 A1 | 8/2020 | Smith |
| 2022/0016996 A1 | 1/2022 | Yang et al. |
| 2022/0248432 A1 | 8/2022 | Balasubramanian |
| 2022/0352751 A1 | 11/2022 | Elshafie |
| 2023/0052957 A1 | 2/2023 | Lee |
| 2023/0246490 A1 | 8/2023 | Park |
| 2023/0261528 A1 | 8/2023 | Park et al. |
| 2024/0163794 A1 | 5/2024 | Wrachien et al. |

OTHER PUBLICATIONS

U.S. Appl. No. 18/374,411, filed Sep. 28, 2023, entitled "Method to Harvest Energy From Neighboring Nodes Within a Communications Network," by inventor Mustafa Murtaza Shamsi.

Lee, E., et al., A Low-Power Authentication IC for Visible-Light-Based Interrogation, IEEE Transactions on Industrial Electronics, vol. 69, No. 3, Mar. 2022, 11 pages.

Ma, H., and Paradiso, J., "The FindIT Flashlight: Responsive Tagging Based on Optically Triggered Microprocessor Wakeup," Responsive Environments Group, Springer-Veriag Berlin Heidelberg, Jan. 1, 2002, pp. 161-167.

Ramos, J., et al., "Towards Energy-Autonomous Wake-up Receiver Using Visible Light Communication," IEEE 13th Annual Consumer Communications & Networking Conference (CCNC), Jan. 2016, 6 pages.

Ripoll-Vercellone, E., et al., "LED-Based Wake-Up Circuit for Microcontrollers," IEEE Transactions on Instrumentation and Measurement, vol. 69, No. 9, Sep. 2020, pp. 5966-5968.

Bluetooth Special Interest Group, Bluetooth® "Low Energy Controller," Specification of the Bluetooth® System, vol. 6, Covered Core Package Version: 5.4, Version Date Jan. 31, 2023, 437 pages.

Silicon Laboratories Inc., "Security Tradeoffs and Commissioning Methods for Wireless IoT Protocols," downloaded from silabs.com on Jan. 22, 2025, 6 pages.

Tran, Le-Giang et al., "RF Power Harvesting: A Review on Designing Methodologies and Applications, " Micro and Nano Systems Letters, Feb. 28, 2017, 16 pages.

Tutuncuoglu, K., and Yener, A., "Cooperative Energy Harvesting Communications with Relaying and Energy Sharing," 2013 IEEE Information Theory Workshop (ITW), Sep. 9-13, 2013, 5 pages IDS IDS.

U.S. Appl. No. 18/899,063, filed Sep. 27, 2024, entitled "Energy Harvesting From Neighboring Nodes by Roaming Devices Within a Network," by inventors Mustafa Murtaza Shamsi et al.

* cited by examiner

POWER AWARENESS FOR ENERGY HARVESTING

BACKGROUND

Field of the Invention

This disclosure relates to power estimation associated with executing user applications.

Description of the Related Art

Power management and efficiency are important features for electronic devices particularly for Internet of Things (IOT) applications where batteries with limited capacity are used to power the IOT device. Accordingly, it would be desirable to provide improvements in operation of IOT devices.

SUMMARY OF EMBODIMENTS OF THE INVENTION

Embodiments described herein determine whether sufficient battery capacity exists before executing a user application.

In an embodiment a method includes determining available power in a power bank supplying power to the integrated circuit and checking to see if the available power is sufficient to execute a user application prior to executing the user application. The method further includes executing the user application responsive to a determination that the available power is sufficient and entering a sleep state for a first time period responsive to a determination that the available power is not sufficient for the user application. Energy is harvested in the sleep state.

In another embodiment a system has an integrated circuit that includes memory having instructions stored thereon and a processor coupled to the memory. The processor executes the instructions to: cause a check to be made for available power in a power bank powering the integrated circuit prior to executing a user application; cause the user application to be executed responsive to a determination that enough power is available in the power bank to execute the user application; and cause a sleep state to be entered for a first time period responsive to a determination that enough power for the user application is not available.

In another embodiment a method includes determining first available power from a battery and determining if the first available power is sufficient to run a user application. The method further includes entering a sleep state responsive to a determination that the first available power is not sufficient to run the user application and harvesting energy in the sleep state. The method further includes waking from the sleep state and determining second available power and executing the user application responsive to the second available power being sufficient to run the user application.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
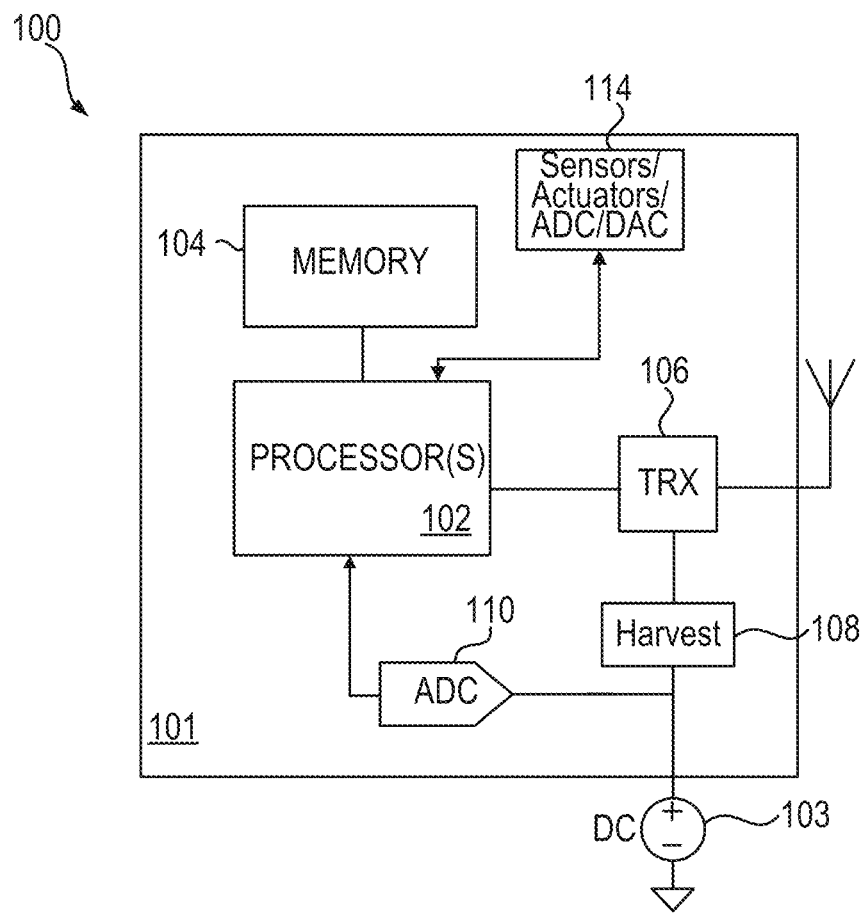
FIG. 1 illustrates a high level block diagram of an exemplary system implementing an embodiment of power awareness approach described herein.

FIG. 1 illustrates a high-level block diagram of a system 100 that includes integrated circuit 101 and a battery 103. The integrated circuit 101 includes one or more processors 102 and associated memory 104. The processor(s) 102 may be implemented as a microcontroller or other processor that executes instructions stored in the memory 104. The memory 104 includes memory for user applications and other software components for functionality required by the system. The memory 104 may include static random access memory (SRAM), non-volatile memory (NVM), and/or dynamic RAM according to the particular application in which the integrated circuit operates. In an embodiment, the system includes a wireless transceiver block 106 that includes circuits to communicate using one or more wireless protocols such as Wi-Fi®, Bluetooth®, Zigbee™, or other short range or long range wireless protocol. In an embodiment, the integrated circuit 101 includes sensors/actuators 114 and analog to digital converters (ADC) and/or digital to analog converter (DAC) circuits to convert sensed data into digital information that can be used by the processor 102 and/or transmitted as needed or to convert commands received by the wireless interface to take an action, e.g., turn on/off home equipment. In an embodiment the integrated circuit 101 performs applications used in Internet of Things (IoT) devices, e.g., home applications such as appliances, lighting control, remote sensing such as water meters, automotive applications, and retail applications. The integrated circuit 101 is powered by a power bank, shown as battery 103, and in an embodiment periodically wakes up to supply or receive data over the wireless transceiver block 106 or perform some other task. While in a sleep state, the integrated circuit harvests energy using energy harvesting block 108. The energy harvesting can be radio frequency (RF) based energy harvesting, kinetic harvesting, thermal, light, or any other energy harvesting mechanisms (or combination of energy harvesting mechanisms) available in the system environment. In an RF based energy harvesting approach, RF energy from RF transmissions from other radios is converted into energy used to power the integrated circuit and/or charge the battery 101. Processor 102 receives a power bank voltage reading from analog to digital converter (ADC) 110. That voltage value can be used to determine the battery capacity that is used to determine what actions to take for user applications as described further herein. Note that ADC 110 may also be used for other functions in integrated circuit 101 such as measuring other voltages in integrated circuit 101, e.g., a voltage associated with a DC-DC converter (not shown) that converts the battery power to an appropriate regulated voltage for operation of various circuits in integrated circuit 101. The ability to harvest energy can extend battery life, which can be particularly useful for IOT applications where battery replacement is difficult.

As explained above, there are many applications in which the system illustrated in FIG. 1 can be used as described earlier such as, e.g., home applications, remote sensing, automotive applications, and retail applications. To implement such functionality, user applications stored in memory 104 run on the processor 102. In a typical application, the user application runs to send and/or receive data, to convert sensed data into digital information that can be used by the processor 102 and/or transmitted as needed or to convert commands received by the wireless interface to take an action, e.g., turn on/off or otherwise control a connected device. After completion of the needed tasks, the use application stops running and the integrated circuit enters a sleep state to save power.

Figure 2:
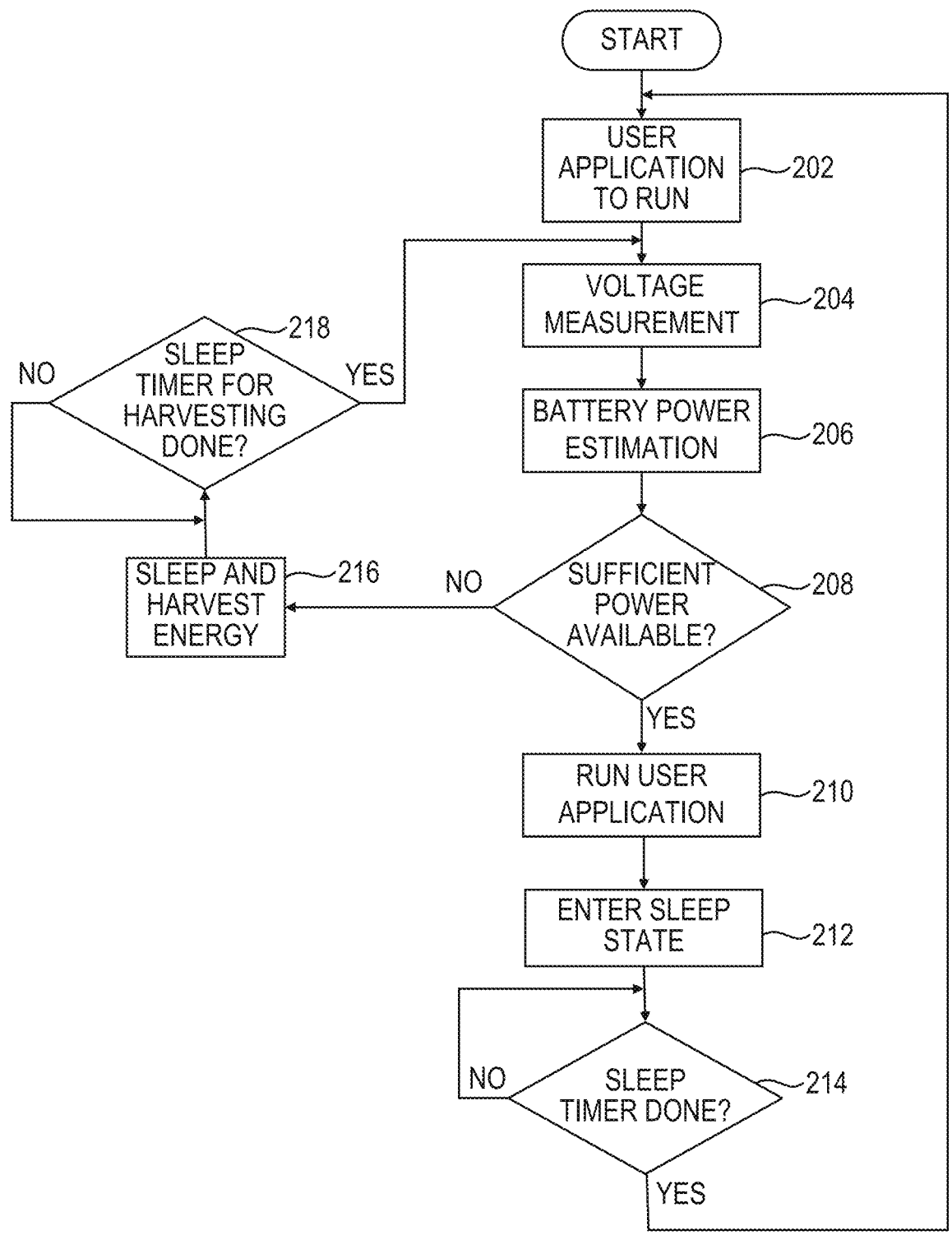
FIG. 2 is a flowchart illustrating an embodiment of the power awareness approach described herein.

In an embodiment, the system 100 checks before a user application is run to see if there is sufficient power in the power bank, e.g., battery 103, to execute the user application. That helps ensure that power is not wasted by partially executing a user application and stopping execution due to low power conditions. FIG. 2 illustrates how the system checks to see if there is sufficient power in the power bank prior to user application execution. Referring to FIGS. 1 and 2, once a user application is scheduled to run or otherwise is about to execute in 202, instructions executing on processor 102 configure the ADC 110 to make a battery voltage measurement and that battery voltage measurement is received by processor 102 in 204. The processor correlates the voltage measured to available power in the battery in 206 to estimate battery power available for the user application. Such correlation is heavily dependent on the particular battery being utilized, e.g., a coin cell battery, capacitor, lithium-ion polymer battery (LiPo), etc. In an embodiment, the type of battery being used in the system is stored in memory to enable the correct correlation or the type can otherwise be known to the software executing on the processor. Once the battery power has been estimated the system checks in 208 to see if there is sufficient power available to run the user application. That requires the power requirements of the user applications to be stored in memory and available for the executing software to make a comparison to the available power. If there is sufficient power available the user application runs in 210 and after completion, the system enters a sleep state in 212. In the sleep state the system is powered down as much as possible to save power but a timer is still active in 214 to determine when to leave the sleep state. Once the timer indicates the end of the sleep state the flow returns to 202 getting ready to run a user application and the system again checks to see if there is sufficient available power to run.

If on the other hand, the system determines in 208 that there is insufficient power to run the user application, the system enters a sleep state in 216 and harvests energy. As described earlier, the type of harvesting performed can vary according to the environment. In an embodiment the system sleeps until the sleep timer is done in 218. The length of time can be a fixed time (or dynamically adjusted) after which another voltage measurement is taken in 204, the battery power estimation is performed in 206, and a determination is made in 208 whether there is sufficient power in the power bank to run the user application. If there is sufficient power, the user application runs, and if not, the system returns to the sleep state and harvests additional energy until there is sufficient energy to run the user application. The system can also check how much energy was harvested during the last sleep state and adjust the sleep timer dynamically to reflect the amount of energy harvested in the most recent harvesting session. Note that when waking up in 218, the system needs to have maintained state during the sleep state in order to determine how much energy was harvested during the last sleep session. That requires the use of non-volatile memory or RAM that can be powered during the sleep state. Preferably such RAM would be able to operate with low power to reduce the amount of power required during the sleep state.

The length of time to sleep can be determined in a number of different ways. In an embodiment, the length of time to sleep depends at least in part on the difference between the battery power estimate of available power and the power required to run the user application. The system sets the sleep timer to be proportional to the difference. That is, the larger the difference, the longer the sleep timer is set in 216.

In addition, in one or more embodiments, the environment also contributes to the determination of the length of the sleep timer. In an embodiment, the system is aware of how much energy is available to be harvested in the particular location in which the system is being used. That availability determines how much energy can be harvested over a particular time period, i.e., the rate of energy harvesting. The availability of energy to be harvested can be estimated in various ways. In one approach, the rate of energy harvesting is based on where the system is deployed. For example, the system may be deployed in a car, in a house, or in a more remote location. In embodiments, the history of energy harvesting can be used to determine the energy harvesting availability. For example, an average of the energy harvesting rate during harvesting sessions or a moving average of the energy harvesting rate for the most recent N harvesting sessions can be used to estimate the next energy harvesting rate, where N is an integer. The system stores the amount of energy harvested and the time period (or just the rate) for each harvesting session in memory 104. In that way, the system can determine how best to estimate the amount of energy available to be harvested. In an embodiment, the system stores information for the most recent harvesting session and uses the most recent data rather than an average, which may be particularly useful for a device that is used in a mobile application. As mentioned above, the length of the sleep timer can be dynamically adjusted during the multiple sleep cycles that occur while harvesting sufficient energy to run a user application. That is, when steps 216 and 218 are repeated in order to harvest sufficient energy, the energy harvesting that occurred most recently can be used to adjust the length of the sleep timer the next time step 216 (sleep and energy harvest) is entered. Alternatively, or in addition to the stored information on energy harvesting, location information, time of day, and/or other criteria, may also be used in determining an estimate of how much energy is available to be harvested.

Figure 3:
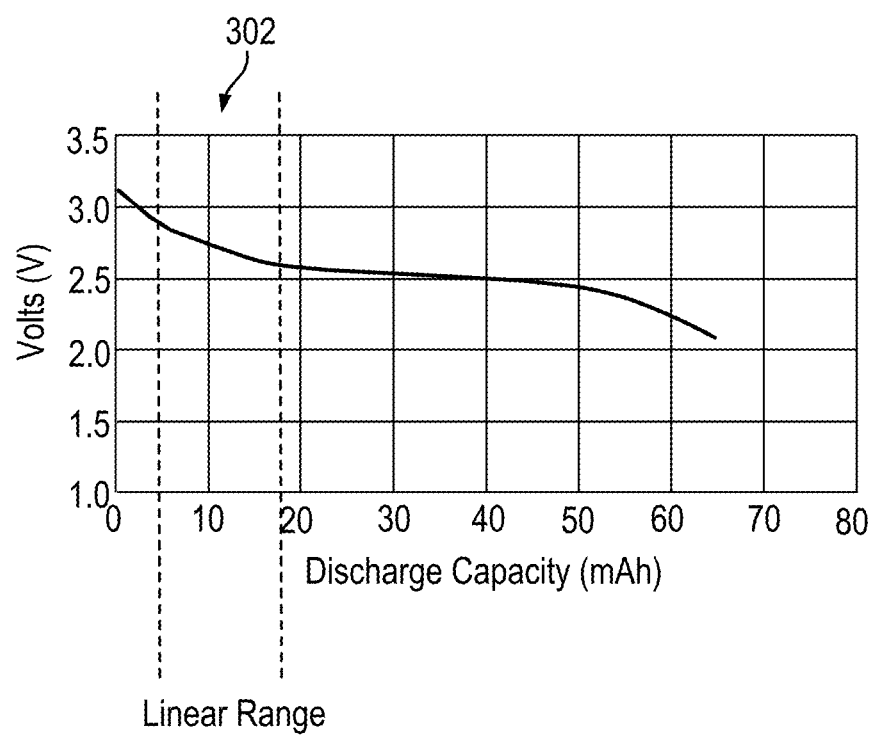
FIG. 3 illustrates a discharge curve of an exemplary battery providing power for device operation.

In an embodiment, the capacity of the battery, as described above is determined based on a voltage measurement. In an embodiment the system uses the linear range of a battery discharge curve to determine battery capacity based on voltage. Referring to FIG. 3, an exemplary discharge curve shows the capacity discharged on the X axis and the voltage on the Y axis. The illustrated curve has a linear range as shown at 302 between ~2.8V and ~2.6V. In an embodiment, the system utilizes linear range, the minimum voltage in the linear range of the discharge curve, and the battery capacity represented in the linear range of the discharge curve. As can be seen, the battery capacity discharged in the linear range is between ~5 mAh and ~18 mAh. Sufficient battery capacity ensures that after running a user application, the measured voltage would not be below the minimum voltage in the linear range, which corresponds to the minimum battery capacity required to ensure that the system can continue to run properly and below which system operation cannot be guaranteed. In an embodiment the minimum capacity is selected to ensure that the system can enter a deep sleep and wake up afterwards. The particular values shown in FIG. 3 will vary based on such factors as battery chemistry, temperature, and power demands. Thus, e.g., some systems operate at a wider voltage range, e.g., for some systems operations at 2.5V are acceptable. While some embodiments utilize discharge characteristics, other embodiments measure battery capacity based, e.g., on Coulomb counting. Thus, various ways to measure battery capacity may be utilized but the amount of power utilized by the user application is known by the system and the decision is made prior to running the user application whether sufficient battery capacity is available to run the user application.

The amount of power used to run the application may be based on empirical data and provided to the system and stored as a static value. In embodiments, the amount of power utilized by an application is measured one or more times during operation by the system, for example for the initial instantiation of the user application, and those one or more measurements are used to initialize or update a stored value in the system.

Figure 4:
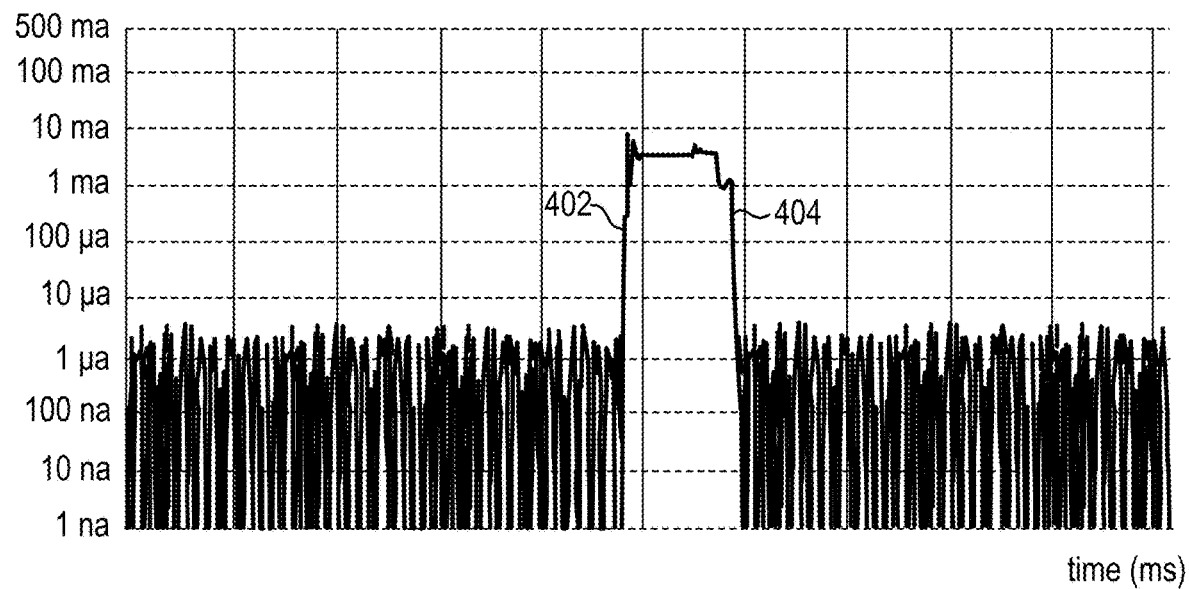
FIG. 4 illustrates the time utilized in checking power according to an embodiment of the power awareness approach described herein.
Figure 5:
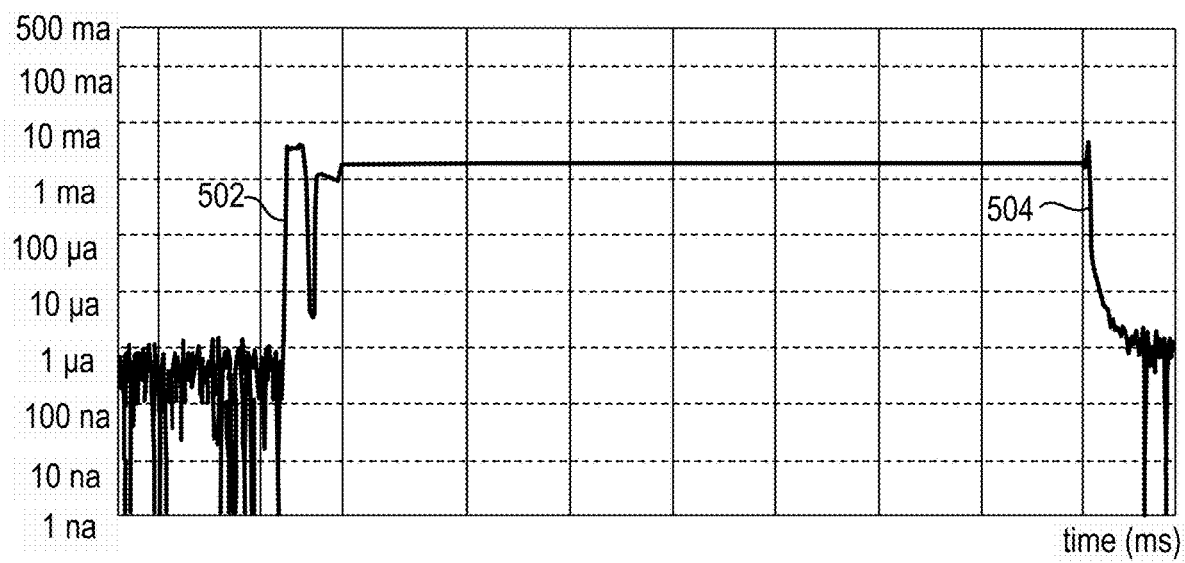
FIG. 5 illustrates the time utilized in executing an example user application after using the power awareness approach described herein.

FIG. 4 illustrates the energy utilized by the power estimator to determine if there is sufficient power to run the user application. The system begins the check at 402 which lasts for ~11 ms and the power estimator consumes ~30 nWh of energy. In the example shown in FIG. 4, there is insufficient battery capacity to run the application and the system enters the sleep state at 404. FIG. 5 illustrates an example in which the power estimator determines there is sufficient battery capacity to run the user application, which starts at 502 and ends at 504, takes ~392 ms to run, and consumes 644 nWh of power. As can be seen the time and power consumed by the power estimator is more than an order of magnitude less than the user application. Of course, any particular user application can take longer or shorter depending on the application. In addition, the amount of power consumed to run the power estimator and the user application depends on the particular system implementation. If the user application is started without sufficient power, it will have to stop and likely be rerun from the beginning thus wasting both time and energy.

It is noted that the functional blocks, devices, and/or circuitry described herein can be implemented using various combinations of analog circuits, digital circuits, and programmable circuits such as software programmed on microcontroller unit (MCU) or other processor to provide the functionality described herein. It is further noted that the software or other programming instructions can be stored in one or more non-transitory computer-readable mediums (e.g., SRAM, DRAM, non-volatile memory, etc.), and the software or other programming instructions when executed by the programmable integrated circuits cause the programmable integrated circuits to perform at least some of the processes, functions, and/or capabilities described herein.

Thus, a power estimator used prior to executing a user application has been described. The description of the invention set forth herein is illustrative and is not intended to limit the scope of the invention as set forth in the following claims. For example, equivalent elements may be substituted for those illustrated and described herein, and certain features may be utilized independently of the use of other features, all as would be apparent to one skilled in the art after having the benefit of this description. Note that the terms "first," "second," "third," and so forth, as used in the claims, unless otherwise clear by context, is to distinguish between different items in the claims and do not otherwise indicate or imply any order in time, location, or quality. Variations and modifications of the embodiments disclosed herein may be made based on the description set forth herein, without departing from the scope of the invention as set forth in the following claims.

What is claimed is:

1. A method comprising:
   determining available power in a power bank supplying power to an integrated circuit and checking to see if the available power is sufficient to execute a user application prior to executing the user application;
   executing the user application responsive to a determination that the available power is sufficient;
   entering a sleep state for a first time period responsive to a determination that the available power is not sufficient for executing the user application; and
   harvesting energy in the sleep state.

2. The method as recited in claim 1 further comprising setting the first time period according to the power required to execute the user application and the available power.

3. The method as recited in claim 1 further comprising:
   responsive to expiration of the first time period, checking if current available power is sufficient for executing the user application.

4. The method as recited in claim 3 further comprising returning to the sleep state and harvesting additional energy if the current available power is insufficient power for the user application.

5. The method as recited in claim 1 wherein the available power is based, at least in part, on a linear portion of a discharge curve of the power bank.

6. The method as recited in claim 1 further comprising:
   storing in a memory in the integrated circuit how much energy is available to be harvested based on one or more recent energy harvesting sessions; and
   determining the first time period based on how much energy is available to be harvested, how much power the user application requires, and the available power.

7. The method as recited in claim 6 further comprising determining the first time period based on how much energy is available to be harvested, power requirements for the user application, and the available power.

8. The method as recited in claim 1 further comprising storing in a memory respective power requirements for each of a plurality of user applications, including the user application.

9. A system comprising:
   an integrated circuit including,
   a memory having instructions stored thereon;
   a processor coupled to the memory, wherein the processor executes the instructions to:
      cause a check to be made for available power prior to executing a user application;
      cause the user application to be executed responsive to a determination that the available power is sufficient to execute the user application; and
      cause a sleep state to be entered for a first time period responsive to a determination that the available power is insufficient to run the user application.

10. The system as recited in claim 9 wherein the system harvests energy in the sleep state.

11. The system as recited in claim 10 wherein responsive to expiration of the first time period, the processor further checks power availability and the processor makes an additional determination if there is sufficient power for the user application to be executed.

12. The system as recited in claim 11 wherein the integrated circuit returns to the sleep state and harvests additional energy if the additional determination indicates there is insufficient power for the user application.

13. The system as recited in claim 9 wherein sufficient power is defined as a minimum power level plus enough power for the user application.

14. The system as recited in claim 13 wherein the minimum power level is based on a linear portion of a discharge curve of a battery supplying power to the integrated circuit.

15. The system as recited in claim 9 wherein the integrated circuit further stores respective power requirements for each of a plurality of user applications, including the user application in the memory.

16. The system as recited in claim 9 wherein the integrated circuit further stores how much energy is available to be harvested based on one or more energy harvesting sessions.

17. The system as recited in claim 9 further comprising a battery coupled to the integrated circuit.

18. The system as recited in claim 9 wherein the first time period is based, at least in part, on the available power and how much power the user application requires.

19. The system as recited in claim 18 wherein the first time period is further based on energy available to be harvested.

20. A method comprising:
    determining first available power from a battery;
    determining if the first available power is sufficient to run a user application;
    entering a sleep state responsive to a determination that the first available power is not sufficient to run the user application;
    harvesting energy in the sleep state;
    waking from the sleep state and determining second available power; and
    executing the user application responsive to the second available power being sufficient to run the user application.

* * * * *